United States Patent

Bodin et al.

(10) Patent No.: US 7,283,687 B2
(45) Date of Patent: Oct. 16, 2007

(54) IMAGING FOR VIRTUAL CAMERAS

(75) Inventors: William Kress Bodin, Austin, TX (US); Derral Charles Thorson, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 1352 days.

(21) Appl. No.: 09/961,957

(22) Filed: Sep. 24, 2001

(65) Prior Publication Data

US 2003/0061617 A1 Mar. 27, 2003

(51) Int. Cl.
*G06K 9/54* (2006.01)

(52) U.S. Cl. ............ 382/305; 382/282; 382/294; 348/14.05; 348/207.11; 348/211.99

(58) Field of Classification Search .......... 382/293, 382/295, 305, 307, 282, 291; 345/734, 738, 345/740; 718/101, 104; 348/211.2, 211.8, 348/211.14, 14.05, 207.11, 211.9
See application file for complete search history.

(56) References Cited

U.S. PATENT DOCUMENTS

| | | | | |
|---|---|---|---|---|
| 5,541,703 A | * | 7/1996 | Suzuka | 396/59 |
| 5,633,678 A | * | 5/1997 | Parulski et al. | 348/231.5 |
| 5,729,471 A | | 3/1998 | Jain et al. | |
| 5,875,296 A | * | 2/1999 | Shi et al. | 726/5 |
| 5,956,424 A | * | 9/1999 | Wootton et al. | 382/192 |
| 6,057,847 A | * | 5/2000 | Jenkins | 345/422 |
| 6,072,496 A | * | 6/2000 | Guenter et al. | 345/419 |
| 6,097,429 A | * | 8/2000 | Seeley et al. | 348/154 |
| 6,144,375 A | | 11/2000 | Jain et al. | |
| 6,182,116 B1 | * | 1/2001 | Namma et al. | 709/204 |
| 6,205,485 B1 | * | 3/2001 | Kikinis | 709/231 |
| 6,304,904 B1 | * | 10/2001 | Sathyanarayan et al. | 709/224 |
| 6,353,848 B1 | * | 3/2002 | Morris | 709/203 |
| 6,538,389 B2 | * | 3/2003 | Onozawa et al. | 315/169.1 |
| 6,567,122 B1 | * | 5/2003 | Anderson et al. | 348/211.3 |
| 6,573,912 B1 | * | 6/2003 | Suzuki et al. | 715/757 |

(Continued)

FOREIGN PATENT DOCUMENTS

EP 0797173 9/1997

(Continued)

OTHER PUBLICATIONS

Drucker, S.M., et al., Proceedings of Graphics Interface '94, pp. 190-199. Presented at a conference in Banff, Canada on May 18-20, 1994.

(Continued)

*Primary Examiner*—Yosef Kassa
(74) *Attorney, Agent, or Firm*—John Biggers; Libby Z. Handelsman; Biggers & Ohanian, LLP

(57) ABSTRACT

Imaging for virtual cameras implemented through a Web site sometimes referred to as an "electronic photo shop." Embodiments include receiving in an electronic photo shop, from a virtual camera coupled for data communications through a network to the electronic photo shop, an image request, the image request comprising a data structure including data elements specifying location coordinates and view direction; retrieving, in dependence upon the location coordinates and view direction, from among stored images, a raw image; transcoding the raw image; and storing the transcoded image in computer memory. Various embodiments include delivering transcoded images via network communications, email, or by use of recording media.

48 Claims, 5 Drawing Sheets

U.S. PATENT DOCUMENTS 6,687,383 B1 * 2/2004 Kanevsky et al. .......... 382/100
6,985,178 B1 * 1/2006 Morita et al. ............ 348/211.3

FOREIGN PATENT DOCUMENTS

| JP | 08-161398 | 6/1996 |
| JP | 2000-197031 | 7/2000 |
| JP | 2000-232660 | 8/2000 |
| JP | 2000-288248 | 10/2000 |
| WO | WO99/65223 | 12/1999 |

OTHER PUBLICATIONS

Proceedings of the International Conference on Multimedia Computing and Systems, pp. 358-361. Presented in Hiroshima, Japan on Jun. 17-23, 1996.

IBM Technical Disclosure Bulletin, vol. 40, No. 9, Sep. 1997, pp. 79-81.

* cited by examiner

User Account - 142

User Acct ID - 144

Defaults – 146

Preferences – 148

Perm Net Addr – 150

Device Type – 152

Email Address - 154

Figure 5

IMAGING FOR VIRTUAL CAMERAS

BACKGROUND OF THE INVENTION

1. Field of the Invention

The field of the invention is images for virtual cameras, or, more specifically, methods, systems, and products for providing images in response to requests from client devices functioning as virtual digital cameras.

2. Description of the Related Art

The state of the art of digital photography is that creation of a snapshot using a digital camera requires that a camera be physically present near the subject to be photographed at the time when the photograph is to be taken. Moreover, snapshots in current art are snapshots of an object as it exists at the time of the snapshot. There is no way in current art to create a snapshot of a subject that is spatially out of view of the camera. There is no way in current art to create a snapshot of a subject at a remote point in time. It would be useful, however, to be able to create a snapshot of a subject not within spatial view of a camera. It would be useful to be able to create a snapshot of a subject as the subject appeared at a time other than the moment when the snapshot is taken.

SUMMARY OF THE INVENTION

Typical embodiments of the invention include methods of imaging for virtual cameras, which are implemented through a Website sometimes referred to as an "electronic photo shop." Typical embodiments include receiving in an electronic photo shop an image request, from a virtual camera coupled for data communications through a network to the electronic photo shop. The image request includes a data structure including data elements specifying location coordinates and view direction. Typical embodiments also include retrieving, in dependence upon the location coordinates and view direction, from among stored images, a raw image; transcoding the raw image; and storing the transcoded image in computer memory.

In typical embodiments of the invention the image request further includes a device type for the virtual camera and transcoding is carried out in dependence upon the device type and a user account identification code. Typical embodiments further include inferring a device type from user account records in dependence upon the account identification code, and transcoding is carried out in dependence upon the device type.

Typical embodiments of the invention include delivering the transcoded image through the network to the virtual camera. In typical embodiments delivering the transcoded image through the network to the virtual camera includes delivering the transcoded image through the network to the virtual camera by use of HTTP messages. In typical embodiments the image request includes a network address and delivering the transcoded image through the network to the virtual camera includes delivering the transcoded image through the network to the virtual camera at the network address. Typical embodiments also include coupling for data communications the virtual camera to the electronic photo shop, wherein coupling for data communications the virtual camera to the electronic photo shop includes dynamically assigning the network address. In typical embodiments, the image request further includes a user account identification code. Typical embodiments further include inferring, in dependence upon the account identification code, from user account records, a permanent network address for the virtual camera, and delivering the transcoded image through the network to the virtual camera further includes delivering the transcoded image through the network to the virtual camera at the permanent network address.

Typical embodiments of the invention include delivering the transcoded image through the network to a designated network address; emailing the transcoded image; and recording the transcoded image on a recording medium. Typical embodiments further include retrieving, in dependence upon the location coordinates and view direction, from among stored audio files, a raw audio file; transcoding the raw audio file; and storing the transcoded audio file in computer memory. Typical embodiments further include delivering the transcoded image and the transcoded audio file to the virtual camera through the network by use of HTTP messages. Typical embodiments also include delivering the transcoded audio file through the network to a designated network address; emailing the transcoded audio file; and recording the transcoded audio file on a recording medium.

The foregoing and other objects, features and advantages of the invention will be apparent from the following more particular description of exemplary embodiments of the invention, as illustrated in the accompanying drawings wherein like reference numbers represent like parts of the invention.

BRIEF DESCRIPTION OF THE DRAWINGS

FIG. 5 is an example data structure diagram useful in exemplary embodiments of user account records.

DETAILED DESCRIPTION OF EXEMPLARY EMBODIMENTS

Introduction

Figure 1:
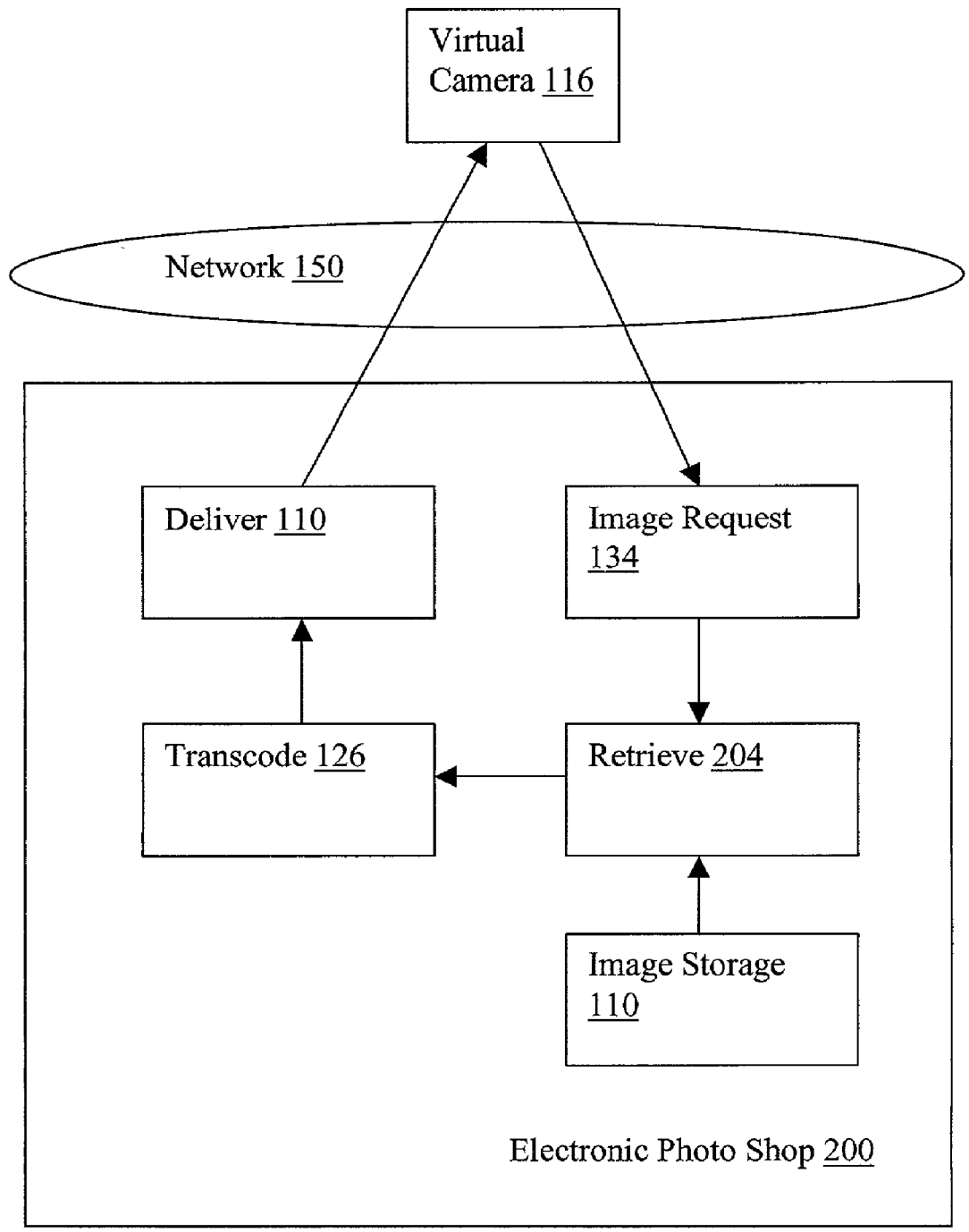
FIG. 1 is a block diagram of a general example embodiment of the system aspect of the invention.

The present invention is described primarily in terms of methods for providing images for virtual cameras. Persons skilled in the art, however, will recognize that any computer system that includes suitable programming means for operating in accordance with the disclosed methods also falls well within the scope of the present invention.

Suitable programming means include any means for directing a computer system to execute the steps of the method of the invention, including for example, systems comprised of processing units and arithmetic-logic circuits coupled to computer memory, which systems have the capability of storing in computer memory, which computer memory includes electronic circuits configured to store data and program instructions, programmed steps of the method of the invention for execution by a processing unit. The invention also may be embodied in a computer program product, such as a diskette or other recording medium, for use with any suitable data processing system.

Embodiments of a computer program product may be implemented by use of any recording medium for machine-readable information, including magnetic media, optical media, or other suitable media. Persons skilled in the art will immediately recognize that any computer system having suitable programming means will be capable of executing the steps of the method of the invention as embodied in a program product. Persons skilled in the art will recognize immediately that, although most of the exemplary embodiments described in this specification are oriented to software installed and executing on computer hardware, nevertheless, alternative embodiments implemented as firmware or as hardware are well within the scope of the present invention.

Definitions

In this specification, the following terms are used as defined here. Other terms are defined elsewhere in the specification and used as defined.

In this specification, the terms "field," "data element," and "attribute" are used as synonyms, referring to individual elements of digital data. Aggregates of data elements are referred to as "records" or "data structures." Definitions of complex data structures that include member methods, functions, or software routines in addition to data elements are referred to as "classes." Instances of complex data structures are referred to as "objects" or "class objects."

"Coupled for data communications" means any form of data communications, wireless, infrared, radio, internet protocols, HTTP protocols, email protocols, networked, direct connections, dedicated phone lines, dial-ups, serial connections with RS-232 or Universal Serial Buses, hard-wired parallel port connections, and other forms of data communications as will occur to those of skill in the art.

The term "network" is used in this specification to mean any networked coupling for data communications. Examples of networks useful with the invention include intranets, extranets, internets, local area networks, wide area networks, and other network arrangements as will occur to those of skill in the art. The use of any networked coupling among virtual cameras, electronic photo shops, and devices coupled through designated network addresses is well within the scope of the present invention. In embodiments of the kind illustrated, virtual camera typically includes devices implemented as automated computing machinery, a Web browser, and an internet client having a network address. There is no requirement within the present invention that the internet client have any particular kind of network address.

"Network address" means any network address useful to locate a virtual camera or a designated network address on any network. Network address includes any internet protocol address useful to locate an internet client, a browser, a virtual camera, or a designated network address on the Internet. Network addresses useful with various embodiments of the invention include local internet protocol addresses, private internet protocol addresses, and temporary Internet addresses assigned to a Web client by a DHCP server, and permanent, official registered Internet addresses associated with domain names.

"URL" means Uniform Resource Locator, a standard method of associating World Wide Web data locations with network addresses for data communications.

"World Wide Web," or more simply "the Web," refers to the well-known system of internet protocol ("IP") servers that support specially formatted documents, documents formatted in a language called "HTML" for HyperText Markup Language. The term "Web" is used in this specification also to refer to any server or connected group or interconnected groups of servers that implement the HyperText Transport Protocol, "HTTP," in support of URLs and HTML documents, regardless whether such servers or groups of servers are coupled to the World Wide Web as such.

"Browser" means a Web browser, a software application for locating and displaying Web pages. Typical browsers today can display text, graphics, audio and video.

A "Web site" is a location on the World Wide Web. Web sites are identified by domain names that resolve to Internet addresses. Web sites include storage locations identifiable by URLs. Web sites are implemented in, on, and as part of Web servers, that is, HTTP servers. Web sites are aggregations of computer software installed and operating on computer hardware.

DETAILED DESCRIPTION

Turning now to FIG. 1, a first aspect of the invention is seen illustrated as a system for imaging for a virtual camera (116). The embodiment illustrated includes a Web site implemented to function as an electronic photo shop (200). The term 'electronic photo shop' is a fanciful descriptive phrase intended to be reminiscent of traditional photo shops where film bearing optical images was sent for developing, printing, and delivery. In an electronic photo shop, by way of analogy, image requests (134) for digital images are sent for retrieval (204), transcoding (126), and delivery (110).

Figure 4:
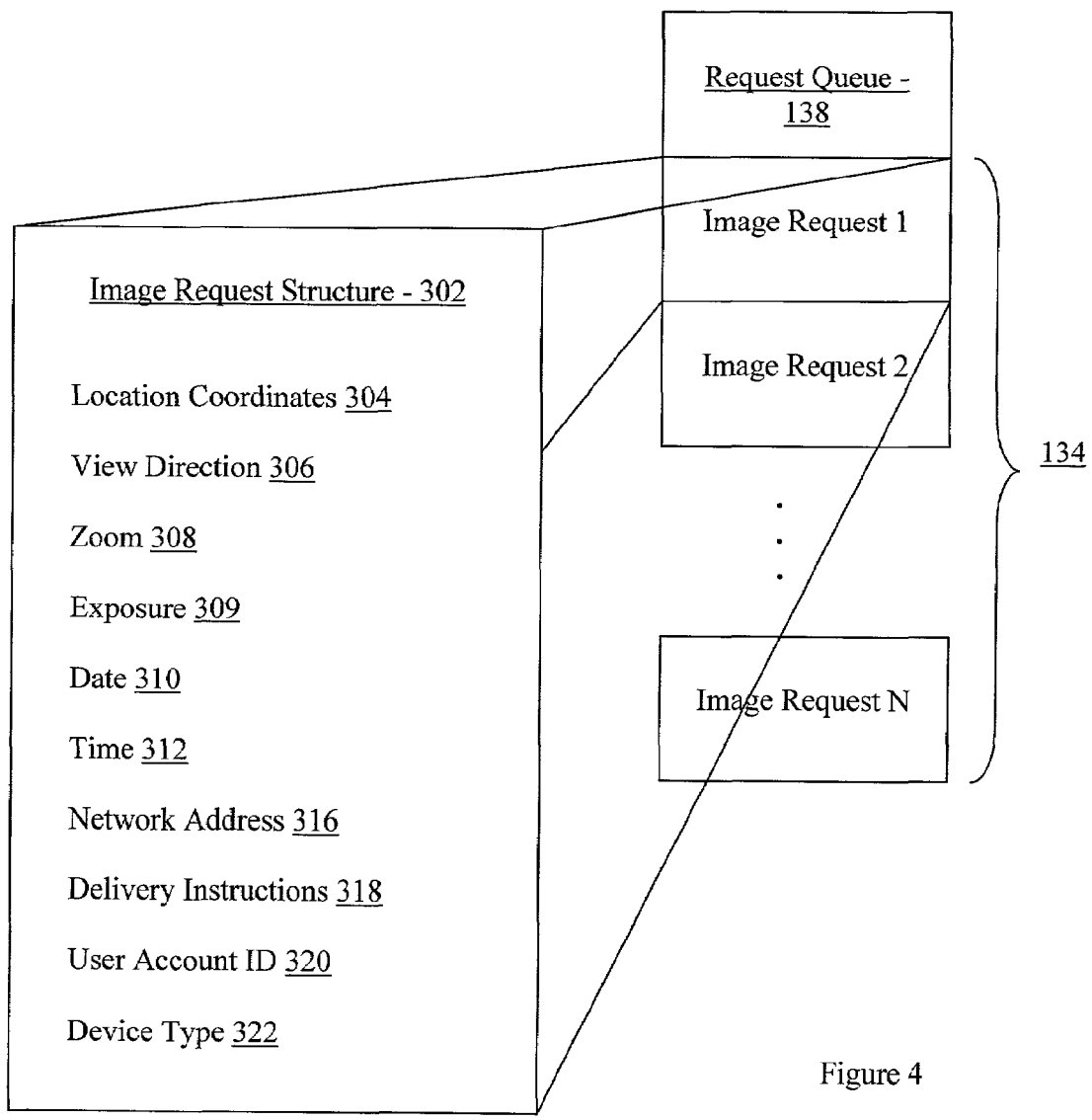
FIG. 4 is an example data structure diagram useful in exemplary embodiments of image requests.

An image requests is a data structure representing a request for preparation of a digital image of a view in a particular direction from a particular location. Image requests are communicated across networks to electronic photo shops of the invention. FIG. 4 illustrates example embodiments of data structures useful as image requests in various embodiments of the invention. The detailed embodiment of image request data structure illustrated in FIG. 4 includes data elements representing location coordinates (304), view direction (306), zoom (308), exposure (309), date (310), time (312), network address (316), delivery instructions (318), user account identification code (320), and a device type (322).

Location coordinates (304) are standard data representations of latitude and longitude, and, optionally, elevation. View direction (306) is a standard data representation of a compass direction from the location coordinates to a subject for imaging. View direction optionally includes a vertical component.

Zoom (308) is an indication of magnification. Alternatively, zoom is considered an indication of relation between the position of a viewer of an image and the size of the image. In some embodiments, as in many typical prior art cameras, zoom is expressed in terms of lens focal length. In embodiments of the present invention that measure zoom in terms of lens focal length, the lens focal length is a conventional or scaled representation in which the standard is generally taken that 45 millimeters gives a 'normal' view, focal lengths of less than 45 millimeters give wide angle views, and focal lengths of more than 45 millimeters give close-up views. The lens focal length is said to be conventional or scaled in such embodiments because, of course, in many such embodiments, using, as they do, virtual cameras, often there are no physical lenses and there are no physical focal lengths.

Exposure (309) is a virtual measure of the darkness or lightness of an image, analogous to what is measured by lens aperture and shutter speed in a physical camera. Exposure in embodiments of the present invention is a virtual measure in the sense that, in many embodiments of virtual cameras, there is no actual lens, no lens aperture, no actual shutter, and no shutter speed.

In the detailed example embodiment of image request data structure as illustrated in FIG. 4, date (310) and time (312) are conventional data representations of the date and time of an image retrieved and transcoded into a virtual snapshot. Within the present invention, there is no requirement that the date and time of the image be the date and time of the virtual snapshot. A user of a virtual camera can take a virtual snapshot at noon of a subject with the resulting image being for midnight, and vice versa. A user of a virtual camera can take a virtual snapshot of a public park at noon in July, when the trees are covered with leaves, and specify in the date field of the image request that the image is to be retrieved and transcoded for January 20 at 4:00 p.m. local time, so that the image depicts the park with late afternoon light on a winter day, with no leaves on the trees.

In image request data structures as illustrated in FIG. 4, the network address (316) is an internet protocol address or a Web address. In many embodiments, the virtual camera includes a browser, often including a wireless Internet connection. Web addresses in some of these embodiments are dynamically assigned to the virtual camera when the camera's browser connects to the Internet, typically by a download from a DHCP server. In other embodiments of this kind, the virtual camera has a permanently assigned Web address associated with the camera, as, for example, a Web addressed resolved through a registered domain name.

In image request data structures of the kind illustrated in FIG. 4, delivery instructions (318) include data representations of user choice regarding delivery of a transcoded image, including, for example, whether the image is to be delivered by download directly to the virtual camera, delivered by email, or delivered by recording an image on a recording medium such as a CD or DVD and mailing it to a user.

Many image request data structures of the kind illustrated in FIG. 4 include a user account identification code (320) which is used in various embodiments of the invention to identify user account records that store information regarding user, including, for example, user preferences regarding image processing and delivery and default information regarding device types for particular users. In addition, many image request data structures of the kind illustrated in FIG. 4 include a field identifying a device type (322) for a virtual camera. Device types of virtual cameras useful in typical embodiments include personal computers, personal digital assistants, and special purpose devices designed and constructed specifically for use as virtual cameras. In fact, device types useful as virtual camera include any device or computer capable of coupling for data communications through a network to an electronic photo shop and transmitting to the electronic photo shop, through the network, image requests.

Figure 2:
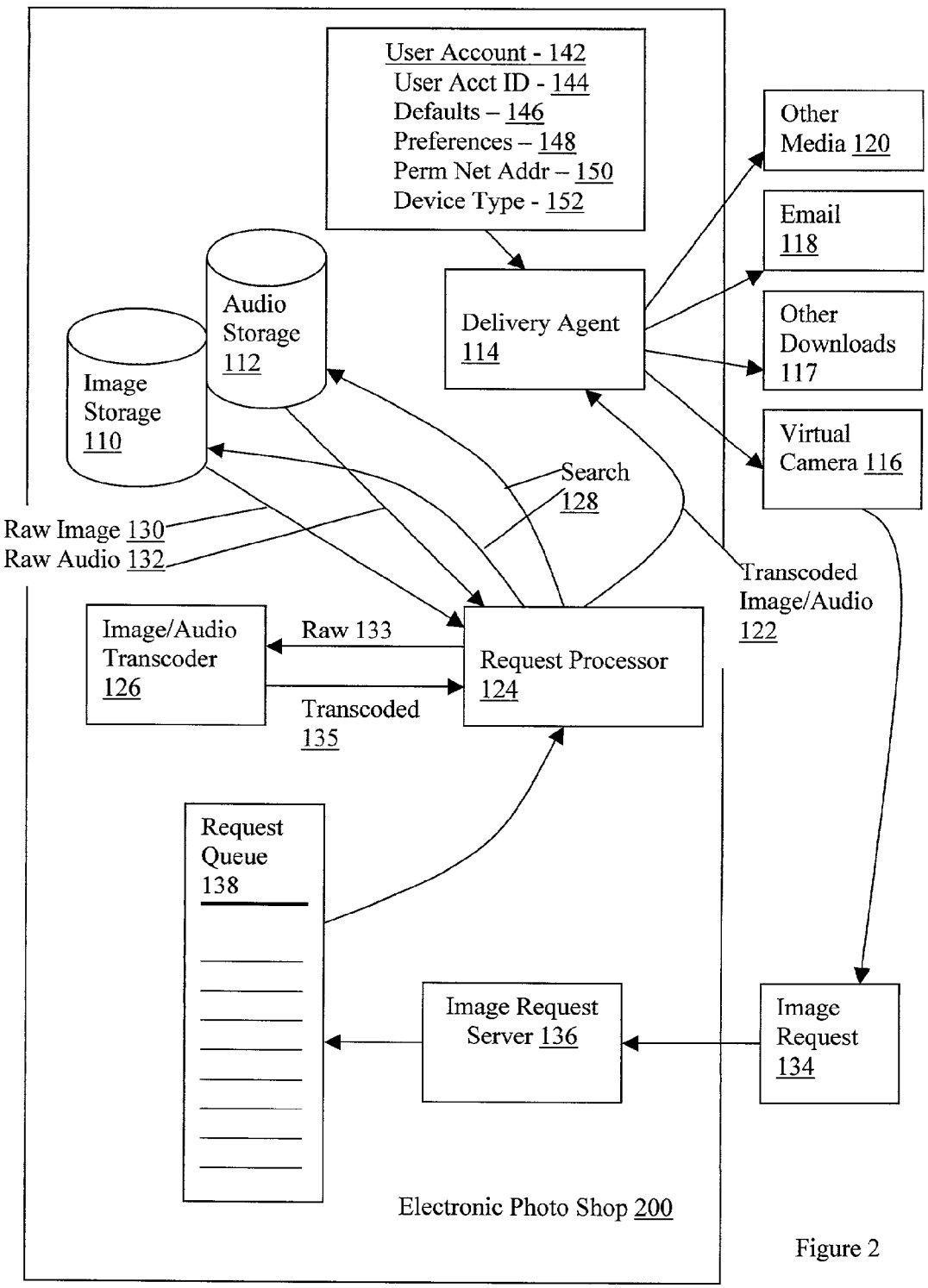
FIG. 2 is a more detailed system diagram illustrating typical example embodiments of the invention.

Turning now to FIG. 2, a more detail embodiment of the invention is shown as a system for imaging for virtual cameras. The embodiment shown in FIG. 2 is implemented as a Web site configured as an electronic photo shop, including an image request server (136). The image request server is software installed and running on computer hardware configured as a server, coupled for data communications to a virtual camera (116), the image request server being programmed to receive image requests (134) and pass them along, for example, through a queue (138), to a request processor (124) for further processing In many embodiments of the present invention, an electronic photo shop can provide audio clips to accompany transcoded images. In embodiments of the kind shown in FIG. 2, audio files are stored (112) in computer memory in a fashion similar to image storage (110). Such computer memory stores (112, 110) are databases containing digital audio and image files, or pointers to actual locations of such files, indexed or sorted according to various pertinent attributes, including, for example, location coordinates and view direction. Such computer memory stores in some embodiments are sorted or indexed also according to zoom, exposure, date, or time. Such computer memory stores are in various embodiments sorted or indexed in other ways as will occur to those of skill in the art, all such ways being well within the scope of the present invention.

Typical embodiments of the kind shown in FIG. 2 include a request processor (124).

The request processor is a software subsystem installed and running on computer hardware, the request processor programmed to search (128) audio and video stores (110, 112), and retrieve from such computer memory stores, raw images (130) and raw audio clips (112) corresponding to an image request. In typical embodiments, a request processor then provides the raw images and audio clips to a transcoder (126) for transcoding. The transcoder (126) transcodes the images and audio and returns transcoded images and transcoded audio (135) to the request processor. The request processor then typically provides the transcoded images and audio clips to a delivery agent (114) for delivery in accordance with user instructions or preferences.

In typical embodiments of the kind shown in FIG. 2, a transcoder (126) is a software subsystem installed and running on computer hardware and programmed to receive raw audio and a raw image (133) and transcode them according to an image request. That is, the transcoder typically will adjust an image to accord with the zoom, exposure, date, time, and device type in accordance with the values of these fields in an image request. Device type indications include, for example, whether a particular virtual camera supports audio, whether a particular virtual camera has a display screen, the size of the display screen on the virtual camera, whether the display screen on a virtual camera supports color, and so on.

In addition to transcoding according to data element values in an image request, the transcoder also operates in dependence upon user preferences (148) and defaults (146) set in user account records (142). That is, for example, in the embodiment shown in FIG. 2, the transcoder (126) infers zoom, exposure, date, and time from user preferences in the absence of a setting for zoom, exposure, date, and time in the image request. That is, for example, a user sets in defaults or preferences in the user's account information (142) that in the absence of a zoom entry in an image request, the transcoder is to set the zoom to 25 millimeters, a wide angle view. This alternative is useful when, for example, the raw image is recorded in storage with a normal view corresponding to a 45 millimeter focal length, which would be provided in the transcoded image, in the absence of an entry in the image request, but for the user preference or default setting.

Similarly, defaults are set for date and time, so that, for example, in the absence of a setting in the image request, the transcoder defaults to producing images based upon the date and time when the image request is received. This example default setting for date and time, of course, is analogous to operation of a physical camera which makes snapshots of subjects as the subjects appear at the time of the snapshot.

Alternatively, for example: A user wants a series of images of subjects as they appear at 10:00 p.m. local time, but is only able to visit the location of the subject at 10:00 a.m. The user then sets a time default on the user's account to 10:00 p.m. and conveniently submits a series of image requests at 10:00 a.m. without bothering to enter time values for each request. Then the transcoder transcodes all the images in this example series to appear as if illuminated by light conditions normally prevalent at 10:00 p.m.

The example embodiment illustrated in FIG. 2 includes a delivery agent (114). The delivery agent in the example embodiment received the transcoded image, optionally with an audio clip, from the request processor (124). The delivery agent also is passed either a pointer to the image request or a copy of the image request. Either way, the delivery agent carries out its work in dependence upon the data in the image request, and, by reading a user account identification code from the image request, as at reference (320) on FIG. 4, the delivery agent also has access to user defaults (146) and preferences (148) regarding delivery. Users override defaults and preferences by including delivery instructions (reference 318 on FIG. 4) in image requests. Thus users through defaults, preferences, and delivery instructions effects delivery of transcoded images through any combination of downloads from the delivery agent (114) to a virtual camera (116); from the delivery agent (114) to other media such as CDs or DVDs and then through regular mail or courier services to a user's physical address; from the delivery agent through email to an email address (118), either the user's email address or any other email address at the user's option; and from the delivery agent (114) directly to other network addresses.

In various embodiments, server-side software and hardware, including electronic photo shops, commercial Websites, delivery agents, and request processors are coupled for data communications to virtual cameras, not necessarily at the same time, but at one time or another. The couplings for data communications take various forms depending on the embodiment, including for example, wireless network connections as well as standard USB (Universal Serial Bus) cable connections or RS-232 (EIA232) connections. The phrase "coupled for data communications" is defined above in this specification, although the definition is not limiting. Other forms of coupling for data communications will occur those of skill in the art, and all such forms are well within the scope of the present invention.

Downloading from the delivery agent (114) to the virtual camera typically includes downloading across a coupling for data communications to a particular network address where the virtual camera is located on a network, in many embodiments an internet, although the use of other kinds of networks is well within the scope of the invention. In many embodiments, a network address for a virtual camera is communicated to the delivery agent through a network address (reference 316 on FIG. 4) data element in an image request, particularly useful with temporary internet addresses dynamically assigned to the virtual camera by a DHCP server. In other embodiments, a virtual camera has a permanently registered internet address and a domain name, either or both on file (150) in a users account data record (142) in the electronic photo shop, which the deliver agent retrieves on the basis of the user's account identification (320 on FIG. 4) read from the image request. Similarly, in various embodiments, the user's email address or alternative email addresses are communicated to the delivery agent through delivery instructions (318 on FIG. 4) in image requests or retrieved from user account records (142).

As mentioned above, however, network couplings are not required as such. Embodiments are well within the invention that simply connect a virtual camera through a USB cable to a computer having a delivery agent running upon it, for purposes of downloading images to a virtual camera. For purposes of communicating image requests from a virtual camera to an image processor or electronic photo shop, it is well within the invention for embodiments simply to connect the camera through a USB cable or RE-232 cable to a computer having running upon it an electronic photo shop or an image request processor.

Figure 3:
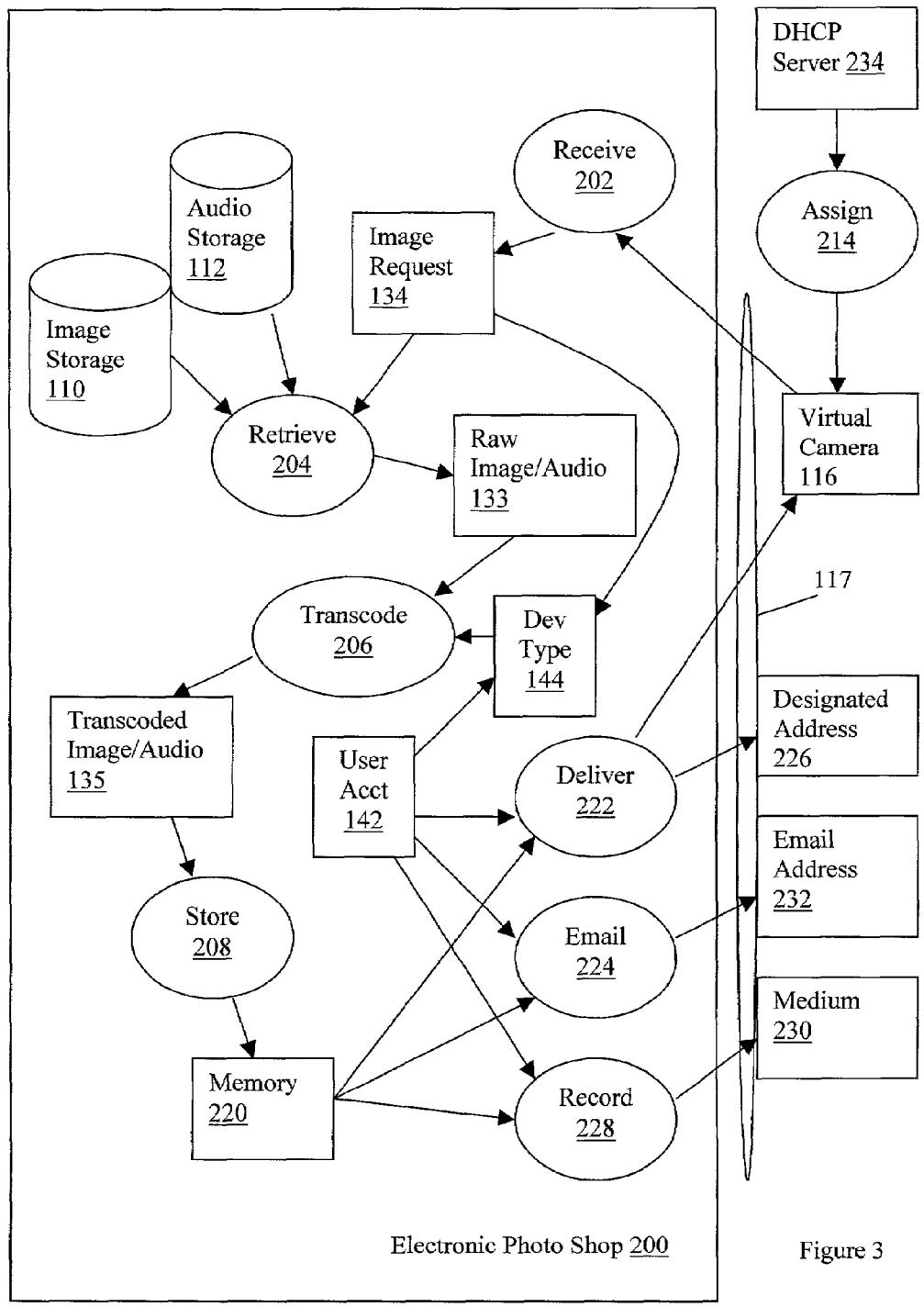
FIG. 3 is a control flow diagram illustrating method aspects of typical embodiments.

Turning now to FIG. 3, a further embodiment of the invention is shown as an example method of imaging for virtual cameras implemented through a Web site called an electronic photo shop. The embodiment shown in FIG. 3 includes receiving (202) in an electronic photo shop (200), from a virtual camera (116) coupled for data communications through a network (117) to the electronic photo shop, an image request (134). In typical embodiments, the image request includes a data structure including data elements specifying location coordinates and view direction (as shown at references 304 and 306 on FIG. 4). The illustrated example embodiment includes retrieving (204), in dependence upon the location coordinates and view direction, from among stored images (110), a raw image (133); transcoding (206) the raw image; and storing (208) the transcoded image in computer memory (220).

In typical embodiments of the kind illustrated in FIG. 3, the image request (134) further includes a device type (144) for the virtual camera and transcoding (116) is carried out in dependence upon the device type. The device type typically identifies such device attributes as whether the device supports graphic display, display screen size, whether the device supports color, whether the device supports audio, and so on. Other attributes of devices to be used as virtual cameras will occur to those of skill in the art, and the use of all such attributes is well within the scope of the present invention. In typical embodiments, the image request (134) further includes a user account identification code (as shown at reference 144 on FIG. 5). Typical embodiments, as shown in FIG. 3, include inferring a device type from user account records (142) in dependence upon the account identification code (144), and transcoding (206) in dependence upon the device type. Inferring a device type from user account records typically includes reading the account identification code from an image request, finding a user account record with the same account identification code, and reading from that user account record a device type.

As shown in FIG. 3, typical embodiments of the invention include delivering (222) a transcoded image (135) through a network (117) to a virtual camera (116). In many embodiments, the network (117) is an internet, the electronic photo shop is implemented as a Web server or includes a Web server, the virtual camera includes a browser, and delivering the transcoded image (135) through the network (117) to the virtual camera (116) includes delivering the transcoded image through the network to the virtual camera by use of HTTP messages. In typical embodiments the image request (134) includes a network address (as shown at reference 316 on FIG. 4) and delivering the transcoded image through the network to the virtual camera further includes delivering the transcoded image through the network to the virtual camera at the network address.

Typical embodiments of the invention include coupling for data communications the virtual camera to the electronic photo shop, wherein coupling for data communications the virtual camera to the electronic photo shop includes dynamically assigning (214) the network address. Dynamically assigning the network address includes receiving a temporary network address in accordance with known protocols from a DHCP server, meaning a Dynamic Host Configuration Protocol server.

In typical embodiments the image request (134) includes a user account identification code (as at reference 320 on FIG. 4). Typical embodiments include inferring, in dependence upon the account identification code, from user account records, a permanent network address (as at reference 150 on FIG. 5) for the virtual camera (116). In this sense, inferring a permanent network address includes reading an account identification code from an image request (as reference 320 on FIG. 4), finding a user account record with the same account identification code (as reference 144 on FIG. 5), and reading a permanent network address (reference 150 on FIG. 5) from the user account record.

In typical embodiments, delivering the transcoded image (135) through the network (117) to the virtual camera (116) includes delivering the transcoded image through the network to the virtual camera at the permanent network address. Typical embodiments also include delivering (222) the transcoded image (135) through the network to a designated network address (226), the designated network address being, for example, some network address other than the network address of the virtual camera. Examples of designated network addresses useful with the present invention include storage locations on user's Web sites identified by URLs including domain names resolving to network addresses. Many other forms of designated network addresses other than the network address of a virtual camera will occur to those of skill in the art, and the use of all such alternative forms of designated network addresses is well within the scope of the present invention.

Typical embodiments, as shown on FIG. 3, further include optional additional modes of delivery such as emailing (224) the transcoded image (135) and recording (228) the transcoded image (135) on a recording medium (230). Other modes of delivery will occur to those of skill in the art, and all such modes of delivery of transcoded images and audio are well within the scope of the present invention.

Typical embodiments of the kind illustrated in FIG. 3 include retrieving (204), in dependence upon the location coordinates and view direction, from among stored audio files (112), a raw audio file (133); transcoding (206) the raw audio file; and storing the transcoded audio file (135) in computer memory(220). Typical embodiments include delivering (222) the transcoded image and the transcoded audio file (135) to the virtual camera (116) through the network by use of HTTP messages and delivering (222) the transcoded audio file through the network to a designated network address (226). Typical embodiments further include emailing (224) the transcoded audio file and recording (228) the transcoded audio file on a recording medium (230).

It will be understood from the foregoing description that various modifications and changes may be made in the preferred embodiment of the present invention without departing from its true spirit. It is intended that this description is for purposes of illustration only and should not be construed in a limiting sense. The scope of this invention should be limited only by the language of the following claims.

What is claimed is:

1. A method of imaging for virtual cameras, the method implemented through a Web site, the method comprising the steps of:
    receiving in the Web site, from a virtual camera coupled for data communications through a network to the Web site, an image request, the image request comprising a data structure including data elements specifying location coordinates and view direction;
    retrieving, in dependence upon the location coordinates and view direction, from among stored images, a raw image;
    transcoding the raw image; and
    storing the transcoded image in computer memory.

2. The method of claim 1 wherein the image request further comprises a device type for the virtual camera and transcoding is carried out in dependence upon the device type.

3. The method of claim 1 wherein the image request further comprises a user account identification code, the method further comprises inferring a device type from user account records in dependence upon the account identification code, and transcoding is carried out in dependence upon the device type.

4. The method of claim 1 further comprising delivering the transcoded image through the network to the virtual camera.

5. The method of claim 4 wherein delivering the transcoded image through the network to the virtual camera further comprises delivering the transcoded image through the network to the virtual camera by use of HTTP messages.

6. The method of claim 4 wherein the image request includes a network address and delivering the transcoded image through the network to the virtual camera further comprises delivering the transcoded image through the network to the virtual camera at the network address.

7. The method of claim 5 further comprising coupling for data communications the virtual camera to the Web site, wherein coupling for data communications the virtual camera to the Web site further comprises dynamically assigning the network address.

8. The method of claim 4 wherein the image request further comprises a user account identification code, the method further comprises inferring, in dependence upon the account identification code, from user account records, a permanent network address for the virtual camera, and delivering the transcoded image through the network to the virtual camera further comprises delivering the transcoded image through the network to the virtual camera at the permanent network address.

9. The method of claim 1 further comprising delivering the transcoded image through the network to a designated network address.

10. The method of claim 1 further comprising emailing the transcoded image.

11. The method of claim 1 further comprising recording the transcoded image on a recording medium.

12. The method of claim 1 further comprising the steps of:
    retrieving, in dependence upon the location coordinates and view direction, from among stored audio files, a raw audio file;
    transcoding the raw audio file; and
    storing the transcoded audio file in computer memory.

13. The method of claim 12 further comprising delivering the transcoded image and the transcoded audio file to the virtual camera through the network by use of HTTP messages.

14. The method of claim 1 further comprising delivering the transcoded audio file through the network to a designated network address.

15. The method of claim 1 further comprising emailing the transcoded audio file.

16. The method of claim 1 further comprising recording the transcoded audio file on a recording medium.

17. A system of imaging for virtual cameras, the system implemented by use of a Web site, the system comprising:
    means for receiving in the Web site, from a virtual camera coupled for data communications through a network to the Web site, an image request, the image request comprising a data structure including data elements specifying location coordinates and view direction;

means for retrieving, in dependence upon the location coordinates and view direction, from among stored images, a raw image;

means for transcoding the raw image; and means for storing the transcoded image in computer memory.

18. The system of claim 17 wherein the image request further comprises a device type for the virtual camera and transcoding is carried out in dependence upon the device type.

19. The system of claim 17 wherein the image request further comprises a user account identification code, the system further comprises means for inferring a device type from user account records in dependence upon the account identification code, and transcoding is carried out in dependence upon the device type.

20. The system of claim 17 further comprising means for delivering the transcoded image through the network to the virtual camera.

21. The system of claim 20 wherein means for delivering the transcoded image through the network to the virtual camera further comprises means for delivering the transcoded image through the network to the virtual camera by use of HTTP messages.

22. The system of claim 20 wherein the image request includes a network address and means for delivering the transcoded image through the network to the virtual camera further comprises means for delivering the transcoded image through the network to the virtual camera at the network address.

23. The system of claim 21 further comprising means for coupling for data communications the virtual camera to the Web site, wherein means for coupling for data communications the virtual camera to the Web site further comprises means for dynamically assigning the network address.

24. The system of claim 20 wherein the image request further comprises a user account identification code, the system further comprises means for inferring, in dependence upon the account identification code, from user account records, a permanent network address for the virtual camera, and means for delivering the transcoded image through the network to the virtual camera further comprises means for delivering the transcoded image through the network to the virtual camera at the permanent network address.

25. The system of claim 17 further comprising means for delivering the transcoded image through the network to a designated network address.

26. The system of claim 17 further comprising means for emailing the transcoded image.

27. The system of claim 17 further comprising means for recording the transcoded image on a recording medium.

28. The system of claim 17 further comprising:

means for retrieving, in dependence upon the location coordinates and view direction, from among stored audio files, a raw audio file;

means for transcoding the raw audio file; and means for storing the transcoded audio file in computer memory.

29. The system of claim 28 further comprising means for delivering the transcoded image and the transcoded audio file to the virtual camera through the network by use of HTTP messages.

30. The system of claim 17 further comprising means for delivering the transcoded audio file through the network to a designated network address.

31. The system of claim 17 further comprising means for emailing the transcoded audio file.

32. The system of claim 17 further comprising means for recording the transcoded audio file on a recording medium.

33. A computer program product of imaging for virtual cameras, the computer program product cable of implementation through a Web site, the computer program product disposed in a computer readable medium, the computer program product comprising computer program instructions capable of:

receiving in the Web site, from a virtual camera coupled for data communications through a network to the Web site, an image request, the image request comprising a data structure including data elements specifying location coordinates and view direction;

retrieving, in dependence upon the location coordinates and view direction, from among stored images, a raw image;

transcoding the raw image; and storing the transcoded image in computer memory.

34. The computer program product of claim 33 wherein the image request further comprises a device type for the virtual camera and transcoding is carried out in dependence upon the device type.

35. The computer program product of claim 33 wherein the image request further comprises a user account identification code, the computer program product further comprises computer program instructions capable of inferring a device type from user account records in dependence upon the account identification code, and transcoding is carried out in dependence upon the device type.

36. The computer program product of claim 33 further comprising computer program instructions capable of delivering the transcoded image through the network to the virtual camera.

37. The computer program product of claim 36 wherein delivering the transcoded image through the network to the virtual camera further comprises delivering the transcoded image through the network to the virtual camera by use of HTTP messages.

38. The computer program product of claim 36 wherein the image request includes a network address and delivering the transcoded image through the network to the virtual camera further comprises delivering the transcoded image through the network to the virtual camera at the network address.

39. The computer program product of claim 37 further comprising computer program instructions capable of coupling for data communications the virtual camera to the Web site, wherein coupling for data communications the virtual camera to the Web site further comprises dynamically assigning the network address.

40. The computer program product of claim 36 wherein the image request further comprises a user account identification code, the computer program product further comprises computer program instructions capable of inferring, in dependence upon the account identification code, from user account records, a permanent network address for the virtual camera, and delivering the transcoded image through the network to the virtual camera further comprises delivering the transcoded image through the network to the virtual camera at the permanent network address.

41. The computer program product of claim 33 further comprising computer program instructions capable of delivering the transcoded image through the network to a designated network address.

42. The computer program product of claim 33 further comprising computer program instructions capable of emailing the transcoded image.

43. The computer program product of claim 33 further comprising computer program instructions capable of recording the transcoded image on a recording medium.

44. The computer program product of claim 33 further comprising computer program instructions capable of:
- retrieving, in dependence upon the location coordinates and view direction, from among stored audio files, a raw audio file;
- transcoding the raw audio file; and
- storing the transcoded audio file in computer memory.

45. The computer program product of claim 44 further comprising computer program instructions capable of delivering the transcoded image and the transcoded audio file to the virtual camera through the network by use of HTTP messages.

46. The computer program product of claim 33 further comprising computer program instructions capable of delivering the transcoded audio file through the network to a designated network address.

47. The computer program product of claim 33 further comprising computer program instructions capable of emailing the transcoded audio file.

48. The computer program product of claim 33 further comprising computer program instructions capable of recording the transcoded audio file on a recording medium.

* * * * *